United States Patent

Iwata et al.

[11] 4,021,826
[45] May 3, 1977

[54] CAMERA CONTROL DEVICE

[75] Inventors: Hiroshi Iwata, Osaka; Katsuji Ishikawa, Daito, both of Japan

[73] Assignee: West Electric Company, Ltd., Japan

[22] Filed: Apr. 14, 1975

[21] Appl. No.: 567,491

[30] Foreign Application Priority Data

Apr. 16, 1974 Japan ............................ 49-43174

[52] U.S. Cl. .................. 354/209; 354/173; 354/204

[51] Int. Cl.² ................. G03B 19/02; G03B 17/42

[58] Field of Search .......... 354/170, 171, 173, 209, 354/204, 205, 206, 30, 50, 51, 60, 230, 207, 208

[56] References Cited

UNITED STATES PATENTS

| | | | |
|---|---|---|---|
| 3,171,338 | 3/1965 | Winkler et al. | 354/171 |
| 3,640,201 | 2/1972 | Kimiua | 354/173 |
| 3,656,420 | 4/1972 | Aizawa et al. | 354/173 |
| 3,680,460 | 8/1972 | Starp | 354/230 |
| 3,754,455 | 8/1973 | Tsujimoto et al. | 354/173 |
| 3,893,136 | 7/1975 | Ando et al. | 354/173 |
| 3,896,459 | 7/1975 | Ogawa et al. | 354/31 |
| 3,903,534 | 10/1975 | Ito | 354/173 |

*Primary Examiner*—Edna M. O'Connor
*Attorney, Agent, or Firm*—Burgess Ryan and Wayne

[57] ABSTRACT

In response to the film drive control pulse signal generated when the shutter is closed, a switching circuit is turned ON to energize a film driving motor. When the film has been transported by a predetermined length, another control signal is generated to turn OFF the switching circuit. A control circuit is connected to a control circuit for controlling the shutter and to a circuit for controlling the motor in such a way that in response to the multi-exposure mode signal the control circuit will not energize the motor even when the pulse signal has been generated after the exposure. Thus the camera control device offers versatile multi-exposure operation.

10 Claims, 12 Drawing Figures

CAMERA CONTROL DEVICE

BACKGROUND OF THE INVENTION

The present invention relates to a camera control device of the type comprising the combination of an electric shutter which may be actuated without requiring the mechanical energization and an automatic film transport device for automatically transporting the film by a predetermined length corresponding to one picture frame after the exposure has been made.

In general, a motor-driven film transport or driving mechanism has been used in combination with a camera of the type in which the shutter is cocked by the mechanical force in order to automatically transport the film. The motor-driven film transport mechanism may be incorporated within the camera or mounted thereupon. However, a relatively large motor and a power supply with a relatively large capacity are required so that the motor may not only transport the film but also cock the shutter mechanism at the same time. As a result, the combination of the motor and its power supply is as bulky as the camera body. Some of the motor-driven film transport mechanisms incorporate a remote control system which must include a solenoid, so that in response to the control signal transmitted from a remote control station the solenoid may be energized to actuate a shutter release member to release the shutter. Thus the camera and its associated equipment become more complex in construction, large in size and heavy in weight.

SUMMARY OF THE INVENTION

One of the objects of the present invention is to minimize the mechanical energy required for actuating a shutter mechanism, thereby minimizing the size and weight of a film transport or driving mechanism including a power supply.

Another object of the present invention is to effect the remote control of a shutter mechanism by a simple electric circuit.

A further object of the present invention is to minimize the number of mechanical parts used in the shutter control mechanism as well as the film transport mechanism, thereby ensuring the long service life of a camera and reducing the fabrication cost thereof.

A further object of the present invention is to remotely control the operations of the film transport mechanism as well as the shutter mechanism in response to an external pulse signals.

To the above and other ends, the present invention provides the combination of a motor-driven film transport mechanism with a program-controlled shutter of the type described in detail in the copending patent application, Ser. No. 519,653.

The program-controlled shutter comprises, in general, a plurality of shutter blades which also function as the aperture blades, and are opened and closed by intermittent driving means such as a stepping motor, and an electric control circuit for controlling the stepping motor. In the film transport system, in response to the pulse signal generated immediately when the shutter blades are close, a switching circuit is turned ON to connect a motor for driving the film to a power supply. When the film has been transported by a predetermined length or one picture frame, another control pulse signal is generated to turn OFF the switching circuit, thereby de-energizing the motor.

According to the present invention, a multi-exposure control circuit capable of distinguishing the multi-exposure signal from the single exposure signal is connected to the shutter control circuit and the film transport control circuit. According to one preferred embodiment of the present invention, in response to the single exposure mode signal consisting of single pulse signal, the program-controlled shutter makes one exposure and then the film transport system transports the film by a predetermined length, or one picture frame. However, when the multi-exposure mode signal consisting of two pulse signals spaced apart by a predetermined time interval is applied to the input terminal of the multi-exposure control circuit, the latter de-energizes the film transport system so that even after the shutter has been triggered the film will not be transported. Therefore, in response to the next single exposure mode signal or multi-exposure mode signal, the same picture frame is exposed again, so that a multiple exposure may be accomplished.

Since the versatile combinations of the single exposure and multi-exposures may be accomplished in a simple manner in response to control signals applied to the multi-exposure control circuit, the remote control of the camera may be effected in a very simple manner. The remote control signal may be transmitted not only by electromagnetic waves but also by light and, sound including the ultrasonic frequencies.

DESCRIPTION OF THE PREFERRED EMBODIMENT

Figure 1A:
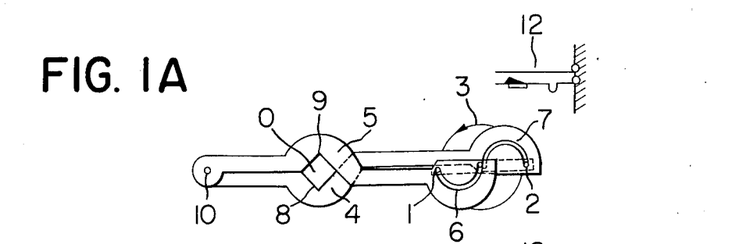
FIGS. 1A and 1B show an exposure control mechanism of a program-controlled shutter which is controlled by a camera control device in accordance with the present invention.
Figure 1B:
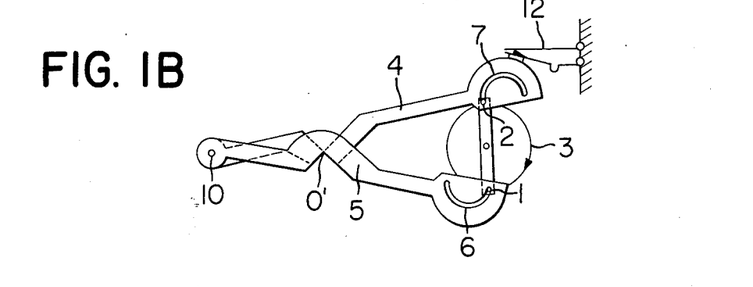

FIGS. 1A and 1B show the shutter or exposure control mechanism which is controlled by a camera control device in accordance with a present invention, and the shutter mechanism is an improvement of that disclosed in the above copending application.

Two shutter blades 4 and 5, which also function as the aperture control blades, are pivoted to each other with a pin 10. The ends of the shutter blades 4 and 5 remote from the pivoted ends terminate semicircular segment portions which are provided with semicircular or arcuate guide grooves 6 and 7 into which are slidably fitted driving pins 1 and 2 of a stepping motor 3. The shutter blades 4 and 5 are also provided with aperture defining portions 8 and 9 which cooperate to define an exposure aperture O in a manner to be described hereinafter.

Above the shutter blades 4 and 5 is located a switch 12 which is closed by the shutter blade 4 when the shutter blades 4 and 5 are completely closed.

When the stepping motor 3 is rotated in steps in the direction indicated by the arrow shown in FIG. 1A, the driving pins 1 and 2 are also moved along the guide slots 6 and 7, so that the aperture 0, which is defined by the shutter blades 4 and 5 as shown in FIG. 1A, is closed as shown at O' in FIG. 1B when the driving pins 1 and 2 are rotated to the positions shown in FIG. 1B. When the stepping motor 3 is rotated in the direction indicated by the arrow in FIG. 1B, the aperture is formed, and the opening area of the aperture is discretely increased as the stepping motor 3 is rotated in steps.

As described above, the switch 12 is closed by the shutter blade 4 when the aperture is closed completely as shown in FIG. 11B. The function of the switch 12 will be described in detail hereinafter.

In the instant embodiment, only two shutter blades 4 and 5 are used, but it is to be understood that a plurality of shutter blades may be used as with the case of the conventional rotary shutters in such a way that they are opened and closed by the stepping motor. In this specification, the assembly of the shutter blades 4 and 5 and the stepping motor 3 and a reset signal generator described hereinafter will be referred to as the "step shutter" hereinafter.

Figure 2:
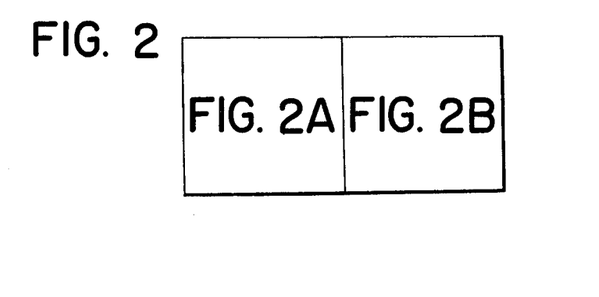
FIG. 2 is a diagram of an electric control circuit for the program-controlled shutter.
Figure 2A:
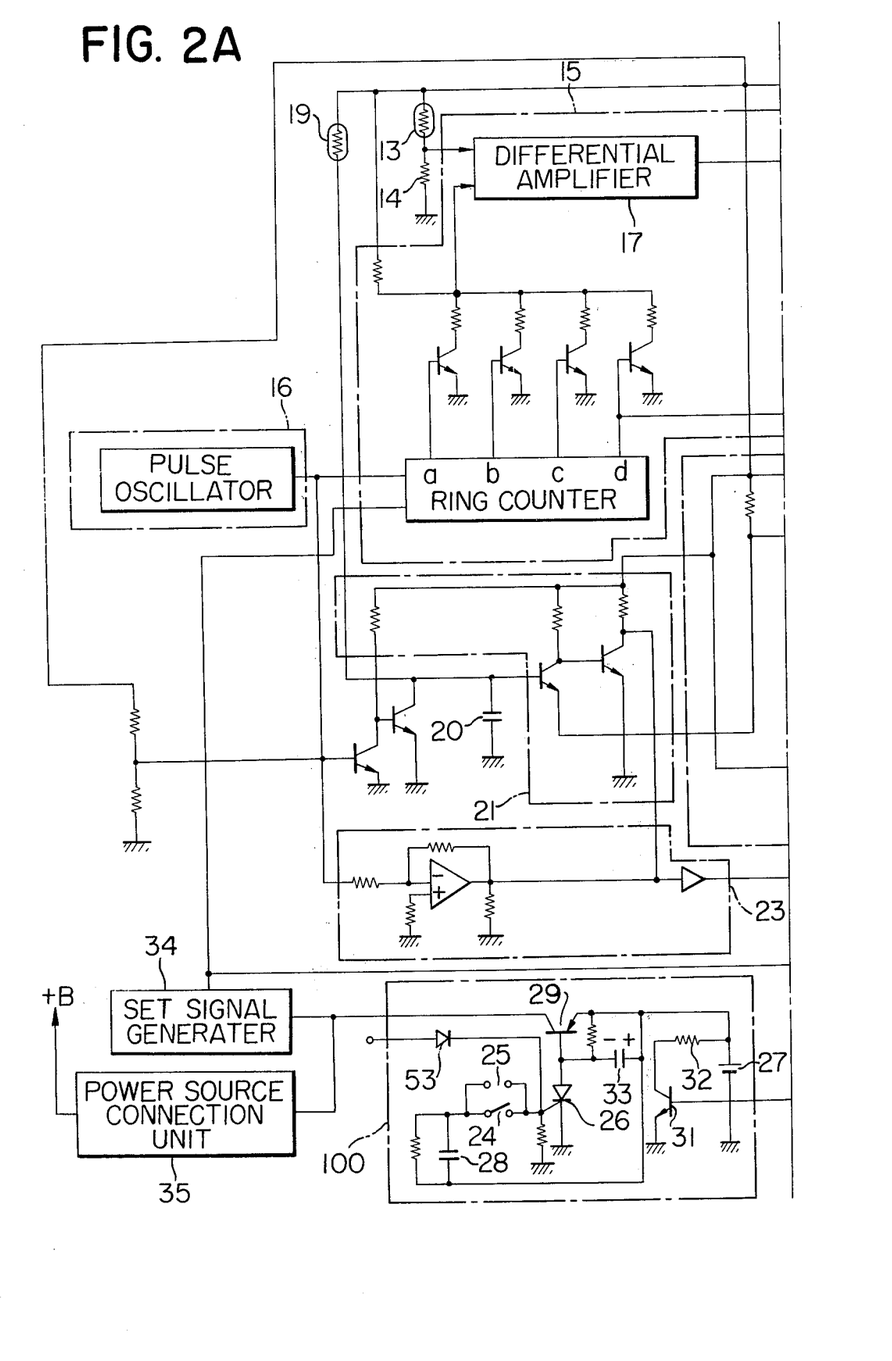
Figure 2B:
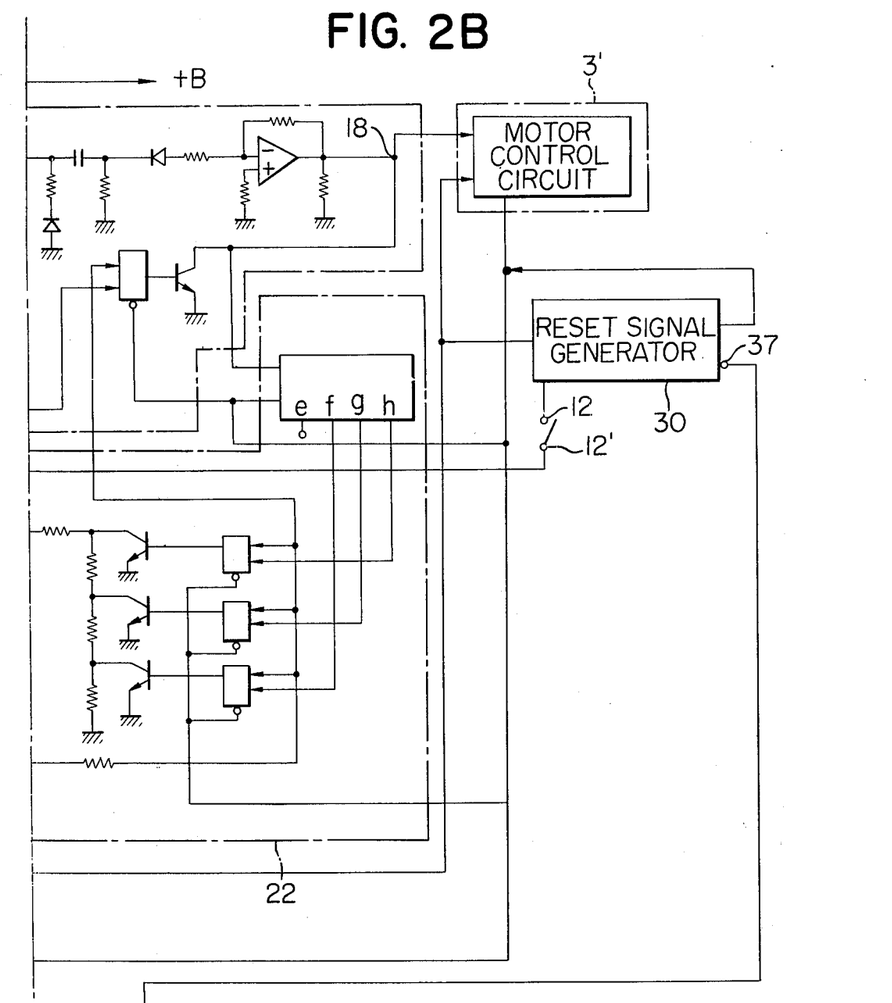
Figure 3:
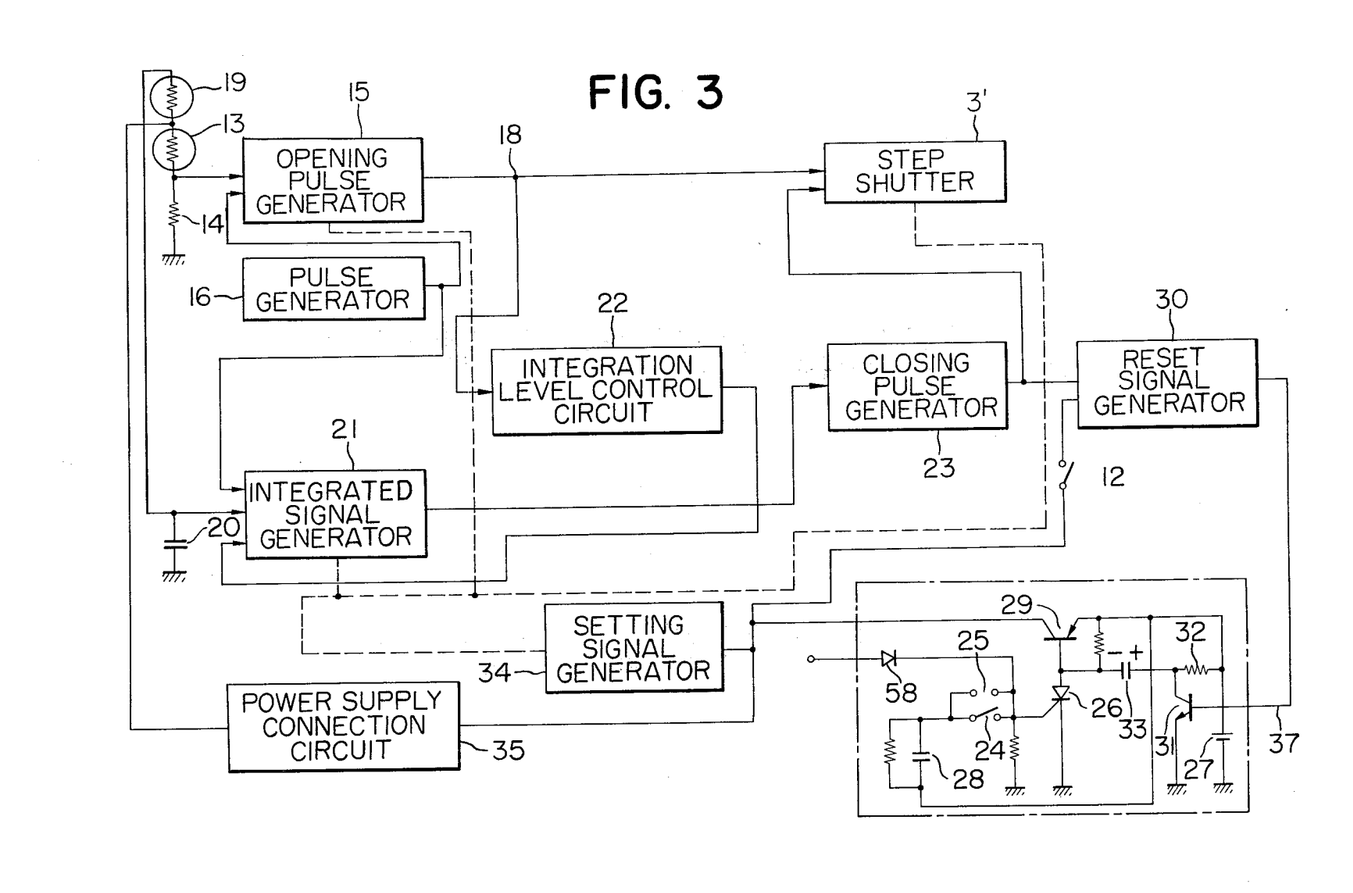
FIG. 3 is a block diagram thereof.

FIG. 2 is a diagram of an electronic control circuit for controlling the step shutter of the type shown in FIGS. 1A and 1B. Since the details of this control circuit have been described in the above copending application, the electronic control circuit will be described briefly with reference to FIG. 3 showing the block diagram thereof.

The first step of the control circuit is to determine the aperture to be defined by the shutter blades 4, and 5 depending upon the brightness of a subject. This step is accomplished by a photocell 13, such as a CdS element, for detecting the brightness of a subject, a resistor 14, an opening pulse signal generator 15, and a pulse generator 16. The voltage across the resistor 14 is dependent upon the intensity of the light intercepted by the photocell 13. The brightness of a subject is applied to one input terminal of a differential amplifier 17 in the opening pulse signal generator 15. Pulses with a predetermined pulse spacing from the pulse generator 16 are applied to the other input terminal of the differential amplifier 17 (See FIG. 2). As a result, the opening pulse signals, the number of which is dependent upon the brightness of the subject, are derived from the output terminal 18 of the opening pulse signal generator 15 and are applied to motor control circuit 3' so that the optimum aperture may be set by the shutter blades 4 and 5.

The second step of the control circuit is to determine the exposure time as a function of the aperture to be defined depending upon the brightness of the subject, and is accomplished by an integrating circuit consisting of a photocell 19 such as a CdS element and a capacitor 20, an integrated signal generator 21, an integration level control circuit 22, a closing pulse signal transmitting circuit 23, and the pulse generator 16. The voltage across the capacitor 20, which is also dependent upon the brightness of the subject, is applied to the integrated signal generator 21, to which are also provided the pulses from the pulse generator 16 and the opening pulse signals transmitted from the opening pulse signal generator 15 through the integration level control circuit 22, so that the closing pulse signals are transmitted through the closing signal transmitting circuit 23 to the motor control circuit 3' a predetermined time after the opening pulse signals have been transmitted to the motor control circuit 3'. In response to these closing pulse signals, the shutter blades 4 and 5 are closed.

In addition to the circuits described above and in the above copending application, according to the present invention an additional control circuit generally indicated by 100 is provided. In this circuit, when a shutter release button (not shown) is depressed, a switch 24 operatively interlocked therewith is closed, a capacitor 28 is charged, so that the current flows into the gate electrode of a silicon controlled rectifier 26. When the silicon controlled rectifier 26 conducts, a transistor 29 also conducts, so that the power is supplied from a battery or power supply 27 to a load connected to the collector of the transistor 29. Since the silicon-controlled rectifier 26 is kept conducting the transistor 29 remains conducting. As a result, the power supplied to the load from the battery 27 is maintained.

As soon as the transistor 29 conducts, a set signal generator 34 is activated, and at a predetermined time after the various circuits have been set in response to the set signal from the set signal generator 34, a power supply connection unit 35 is actuated so that the battery 27 may be connected to the various circuits.

When the shutter blades 4 and 5 are closed, the switch 12 (See FIG. 1B) is also closed so that a reset signal generator 30 is actuated. The reset signal is transmitted through a terminal 37 to the base of a transistor 31 so that the latter conducts. As a result, a capacitor 33 which has been charged through a resistor 32 with the polarities shown is discharged through the transistor 31, so that the silicon controlled rectifier 26 is turned OFF or reset.

The above described operation may be also carried out in response to an external signal applied through a diode 53.

Figure 4:
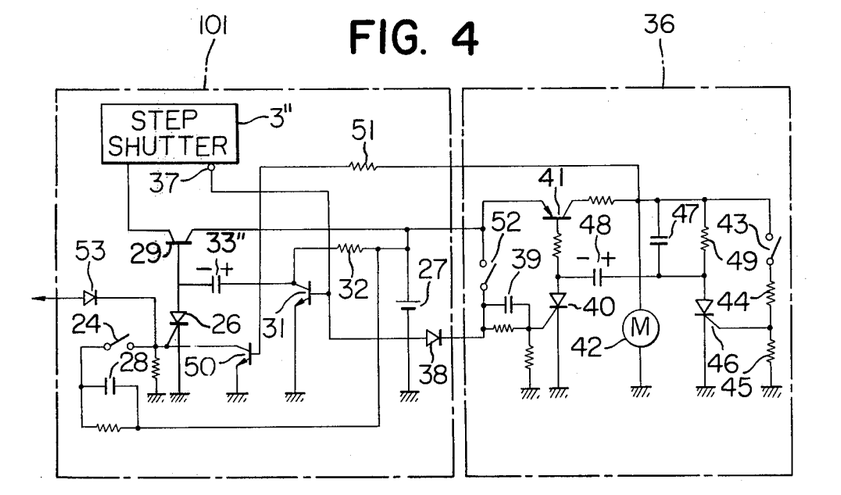
FIG. 4 is a circuit diagram of a film transport control circuit in accordance with the present invention coupled to the program-controlled shutter control circuit shown in FIGS. 2 and 3.

FIG. 4 is a diagram of a control circuit 36 for controlling a DC motor for driving a film and a step shutter control circuit 101.

When the switch 12 (See FIG. 1B) is closed, the film drive control signal B (See FIG. 5) is transmitted from the output terminal 37 of the step shutter 3'' through a diode 38 and the capacitor 39 to the gate electrode of a silicon-controlled rectifier 40, so that the latter conducts. As a result, a transistor 41 is also conducted so that the battery 27 is connected to a DC motor 42 for driving the film. The DC motor 42 is driven to transport the film. When the film is transported by a predetermined length, suitable means such as a sprocket wheel with eight teeth in engagement with the perforations of the 35-mm film makes one rotation so as to close a switch 43. As a result, an current, whose magnitude is determined by the ratio of resistors 44 and 45, making up a voltage divider, flows into the gate electrode of a silicon controlled rectifier 46, so that the latter conducts. As a consequence, the DC motor 42 is shunted by a capacitor 47. This means that the brushes or terminals of the DC motor 42 are short-circuited so that an effective electric brake is applied. Therefore the DC motor 42 immediately stops. Concurrently a capacitor 48 which has been charged with the polarities shown is discharged through the silicon controlled rectifier 46, so that the silicon controlled rectifier 40 is turned OFF. As a result, the transistor 41 is also turned off, so that the DC motor 42 is disconnected from the power supply or battery 27.

The capacitor 48 is inserted in order to instantaneously apply the effective electric brake to the DC motor 42. Accordingly, not only its value but also the value of a resistor 49 are so selected as to correspond to the brake application time.

Figures 5, 6:
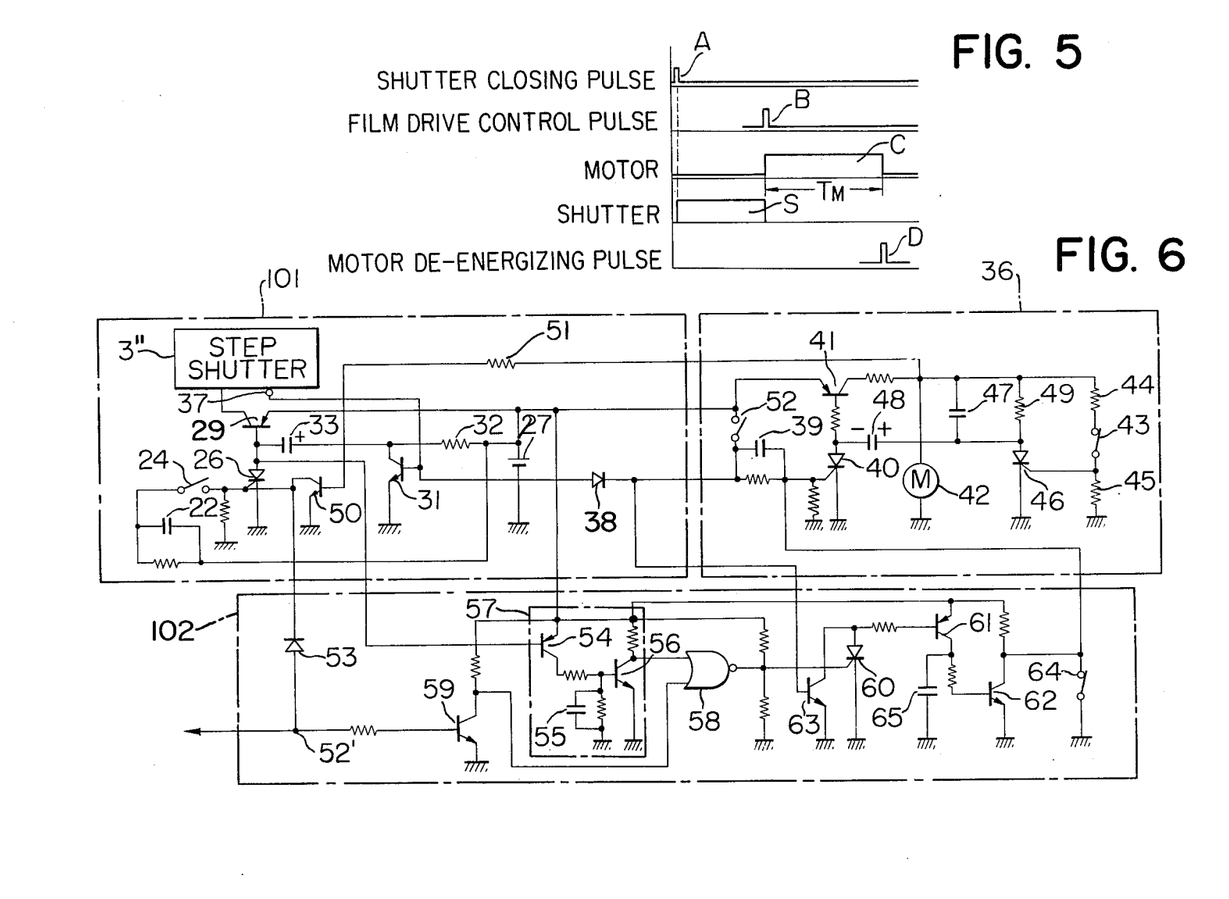
FIG. 5 is a time chart used for the explanation thereof.
FIG. 6 is a diagram of a multi-exposure control circuit operatively coupled to the control circuits shown in FIG. 4.

Referring to FIG. 5, in response to the film drive control signal B, the DC motor 42 is driven for a time $T_M$ required for driving the film one picture frame as shown at C in FIG. 5, and is stopped in response to the stop signal which is the voltage across the resistor 45 as shown at D in FIG. 5.

Referring back to FIG. 4, a transistor 50 is inserted in order to prevent the erratic re-exposure due to the erratic operation of the step shutter 3" caused by the erratic closing of the switch 24 during the period when DC motor 42 is driven. The voltage across the DC motor 42 is provided through a resistor 51 to the base of the transistor 50 so that the latter conducts to short-circuit the gate electrode of the silicon controlled rectifier 26 during period when the DC motor 42 is driven, thereby preventing the erratic operation of the step shutter 3". In order to advance the film to the automatic driving position when the film is loaded into the camera, a switch 52 is provided. When the switch 52 is closed, the power supply 27 is connected to the control electrode of the silicon controlled rectifier 40, so that the latter conducts. Thereafter the film driving operation is accomplished in a manner substantially similar to that described above to set the film to the automatic driving position. This switch 52 may be depressed when it is desired to drive the film without exposing it.

The combination of the step shutter and the film drive control circuit described above permits the following three modes of operation of the camera.
First or single exposure mode: In response to the exposure signal.
 the step shutter is opened once and thereafter the
 film is advanced by one frame;
Second or multi-exposure mode: the automatic driving of the
 film is suspended so that the exposure may be repeated
 as many times as desired; that is, a multi-exposure
 may be produced; and
Third mode: after the first mode is accomplished, the second
 mode follows it.

FIG. 6 shows a diagram of a circuit for carrying out the above three modes. First the first or single exposure mode will be described. When the external control signal (See FIG. 5A) is applied to a terminal 52', it is transmitted through a diode 53 to the silicon controlled recitifer 26, so that the latter conducts. As a result, the control circuit 101 causes the step shutter 3" to make one exposure, and thereafter the film drive control circuit 36 causes the motor 42 to drive the film by one frame in the manner described above.

Figure 7:
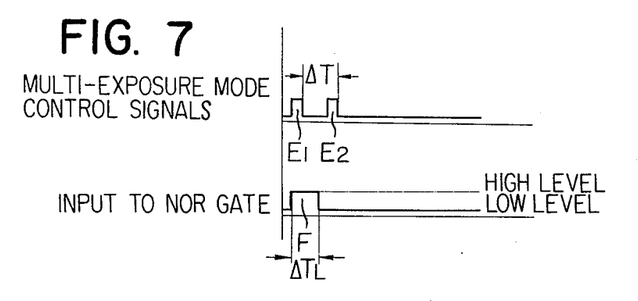
FIG. 7 is a diagram used for the explanation thereof.

To accomplish the second or multi-exposure mode, the two control pulse $E_1$ and $E_2$ (See FIG. 7) spaced apart by $\Delta t$ from each other are sequentially applied to the terminal 52'. In response to the first control pulse $E_1$, the step shutter 3" makes one exposure in the manner described above. The circuit shown in FIG. 6 incorporates a delay circuit generally indicated by 57. The relay circuit 57 comprises a transistor 54, a capacitor 55 and a transistor 56. The base of transistor 54 is connected to the anode of the silicon controlled rectifier 26. The collector of the transistor 56 is connected to one input terminal of a NOR gate 58. The first control pulse $E_1$ is also applied to the base of a transistor 59 whose collector is connected to the other input terminal of the NOR gate 58. Therefore, in response to the first control pulse $E_1$, the transistor 59 conducts, so that a lowlevel signal is applied to the other input terminal of the NOR gate, but the low-level signal to be applied to the other input terminal of the NOR gate is delayed by t by the delay circuit 57 as shown in FIG. 7, so that no output signal may be derived from the NOR gate 58 in response to the first control pulse $E_1$. But when the transistor 59 again conducts in response to the second control pulse $E_2$ which lags behind the first control pulse $E_1$ by $\Delta t$, so that when the low-level signal is applied to the other input terminal of the NOR gate 58, the low-level signal from the delay circuit 57 is concurrently applied to one input terminal of the NOR gate 58, so that a high-level output signal is derived therefrom and transmitted to the control electrode of a silicon controlled rectifier 60 and to the base of a transistor 61 to turn them on. As a result, a transistor 62 also conducts, so that the gate electrode of the silicon controlled rectifier 40 is short-circuited. That is, the film drive control signal which is generated when the step shutter 3" is closed in the manner described hereinbefore is not applied to the film drive control circuit 36. Consequently, even when the exposure is completed, the film is not advanced at all.

Figure 8:
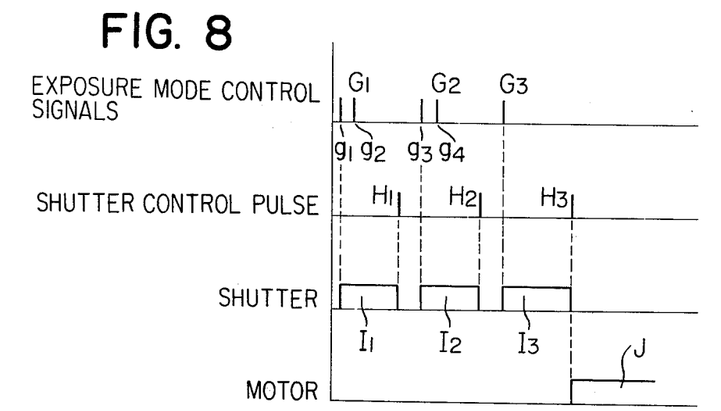
FIG. 8 is a diagram used for the operation of the camera control device in response to the remote control signals.

In summary, one control pulse signal is applied to the terminal 52' when the first mode of operation is desired, and two control pulse signals are applied when the second mode of operation is desired. For the third mode of operation, the first and second modes are repeatedly cycled as many times as desired. For instance, when it is desired to carry out a multi-exposure to expose one picture frame three times and then to drive the film, the exposure mode control signals $G_1$, $G_2$ and $G_3$ as shown in FIG. 8 are sequentially applied to the terminal 52'. That is, in response to the first control pulse $g_1$ of the first second mode control signal $G_1$, the step shutter 3" makes one exposure, but because of the second control pulse $g_2$ the film drive control circuit is deactivated in the manner described above, so that the film is not driven. More particularly, the step shutter is opened in response to the first control pulse $g_1$ and is closed in response to the closing signal $H_1$, so that the step shutter 3" is opened as shown at $I_1$ in FIG. 8. In like manner, in response to the first control pulse $g_3$ of the second mode control signal $G_2$ the step shutter 3" is opened and then closed in response to the closing signal $H_2$, so that the exposure as shown at $I_2$ in FIG. 8 may be attained. However, because of the second control pulse $g_4$ the film is not driven. Thereafter, in response to the first mode control signal $G_3$, the shutter 3" is opened and then closed in response to the closing signal $H_3$, so that the exposure as shown at $I_3$ in FIG. 8 may be attained. Thereafter, the DC motor 42 is energized as indicated at J in FIG. 8, so that the film is advanced by one picture frame. Thus one picture frame was exposed three times.

When it is desired to attain a multi-exposure by manual operation of the camera, a switch 64 (See FIG. 6) is closed to deactivate the film drive control circuit 36, so that the operation of the step shutter 3' may be manually controlled in the manner described hereinbefore.

Referring back to FIG. 6, a transistor 63 is inserted in order to turn OFF the silicon controlled rectifier 60. Unless the silicon controlled rectifier 60 is forced to be turned OFF after it has been turned ON, to turn ON the transistors 61 and 62 to short-circuit the gate electrode of the silicon controlled rectifier 40 in the film drive control circuit 36, the latter is kept deactivated. To solve this problem, in response to the signal from the step shutter 3" the transistor 63 conducts so that the silicon controlled rectifier 60 and hence the transistors 61 and 62 are turned OFF. Therefore, the control signal from the step shutter 3" may be applied to the gate electrode of the silicon controlled rectifier 40.

From the foregoing description, it is seen that the versatile combinations of the single exposures and multi-exposures may be controlled by the combinations of the first and second mode control signals.

Next referring to FIG. 9, the wireless remote control for the single exposure, the multi-exposure and the film drive will be described hereinafter. The connection between a transmitter 66 and its power supply 73 is interrupted by a switch 69 to generate a control pulse, which in turn is radiated from an antenna 68. The radiated control pulse 67 is received by an antenna 70 of a receiver 71 and is detected by a detector 72, so that the pulse control signal shown at A in FIG. 5 may be derived. By the switch 69, various control signals may be generated. For instance, to generate the second mode control signal consisting of two control pulses as shown in FIG. 9, the switch 69 is closed twice at a time interval of $\Delta t$.

Figure 9:
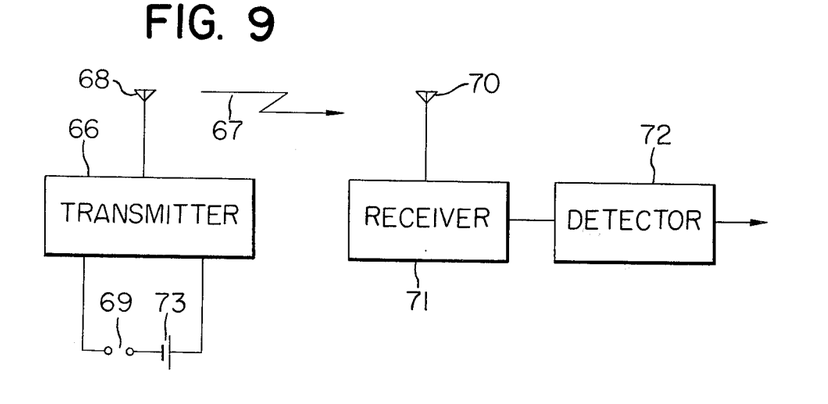
FIG. 9 is a schematic diagram for the explanation of the wireless remote control of the camera control device in accordance with the present invention.

In the remote control system shown in FIG. 9, the control pulses are generated by opening and closing the switch 69, but it is to be understood that any conventional remote conrol pulse signal transmission systems such as amplitude and frequency modulations of the continuous carrier waves may be employed. Furthermore, instead of the wireless remote control system, any of the suitable conventional light or sound remote control systems may be used.

What is claimed is:

1. A camera control device comprising
A. an exposure control mechanism comprising shutter blades defining an exposure aperture, and a stepping motor operatively coupled to said shutter blades to open and close said exposure aperture in a plurality of discrete steps in response to motor driving signals applied for controlling the exposure of a film;
B. shutter control means for providing said driving signals, thereby electrically controlling the operation of said exposure control mechanism;
C. film transporting means electrically connected to said exposure control mechanism and including a motor for transporting the film by a predetermined length in response to closing of said exposure aperture;
D. operation mode control means electrically connected to said exposure control mechanism, said film transporting means and a power supply for selectively interfering with the response of said film transporting means to said shutter blades;
E. said power supply comprising means for supplying the power to said shutter control means, said film transporting and said operation mode control means.

2. A camera control device as set forth in claim 1 wherein said film transporting means comprises
a. a film driving motor;
b. a first switching means connected to said power supply means and said film driving motor and actuated by a film driving signal in response to said closing of asid exposure aperture to connect electrically said film driving motor to said power supply means;
c. film transport detecting means
d. a switch element connected parallel to said film driving motor in response to a signal from said film transport detecting means; and
d. a turn-off circuit means connected between said first switching means and said switch element for turning off said first switching means through said switch element.

3. A camera control device as set forth in claim 2 wherein said first switching means further comprises a manual switching means for switching said first switching means.

4. A camera control device as set forth in claim 1 wherein said operation mode control means comprises
a. an operation mode control signal discriminating means for selectively not generating and generating a signal corresponding to operation mode control signals;
b. a means for supplying operation mode control signals to said power supply means and said operation mode control signal discriminating means; and
c. a switching means for generating a signal to control the actuation of said film drive control means selectively corresponding to the signal from said operation mode control signal discriminating means.

5. A camera control device as set forth in claim 4 wherein said operation mode control signal discriminating means comprises a switch element actuated in response to the operation mode control signals which are one pulse signal and two pulse signals used selectively, a delay circuit actuated in response to a signal from said power supply means according to the operation mode control signal, and a NOR circuit generating a signal in response to signals from said switch element and said delay circuit.

6. A camera control device as set forth in claim 4 wherein said switching means comprises a switch element actuated in response to the signal from said operation mode control signal discriminating means and a switching circuit actuated by conduction of said switch element.

7. A camera control device as set forth in claim 6 wherein said switching element is capable of being short-circuited by a further switch element in response to a signal from an exposure aperture closed signal generating means.

8. A camera control device as set forth in claim 6 wherein output terminals of said switching circuit are capable of being selectively short-circuited by a manually operated switch element.

9. A camera control device as set forth in claim 4 wherein said operating mode control signals are capable of being applied with a switch by operating a shutter release button.

10. A camera control device in a camera as set forth in claim 4 wherein said operating mode control signals are capable of being applied by a source remote from said camera.

* * * * *

UNITED STATES PATENT OFFICE
CERTIFICATE OF CORRECTION

Patent No. 4,021,826              Dated  May 3, 1977

Inventor(s) Hiroshi Iwata et al.

It is certified that error appears in the above-identified patent and that said Letters Patent are hereby corrected as shown below:

Column 1, line 63, "close" should be -- closed --.

Column 2, line 7, after "of" insert -- a --.

Column 6, line 2, "relay" should be -- delay --;

line 14, "t" should be --$\Delta$t --.

Column 8, line 9, "asid" should be -- said --.

Signed and Sealed this

Twenty-ninth Day of November 1977

[SEAL]

Attest:

RUTH C. MASON
Attesting Officer

LUTRELLE F. PARKER
Acting Commissioner of Patents and Trademarks

UNITED STATES PATENT OFFICE
CERTIFICATE OF CORRECTION

Patent No. 4,021,826      Dated May 3, 1977

Inventor(s) Hiroshi Iwata, et al.

It is certified that error appears in the above-identified patent and that said Letters Patent are hereby corrected as shown below:

Column 2, lines 21-22, change "exposure" to -- exposures --.

Column 2, line 57, "the" should be -- a --.

Column 4, line 59, "an" should be -- a --.

Column 8, line 16, "d." should be -- e. --.

Signed and Sealed this

Ninth Day of May 1978

[SEAL]

Attest:

RUTH C. MASON
Attesting Officer

LUTRELLE F. PARKER
Acting Commissioner of Patents and Trademarks